United States Patent
Schieber et al.

(10) Patent No.: US 11,911,851 B2
(45) Date of Patent: Feb. 27, 2024

(54) METHOD AND DEVICE FOR LASER CUTTING A SHEET METAL BLANK FROM A CONTINUOUSLY CONVEYED SHEET METAL STRIP

(71) Applicant: Schuler Pressen GmbH, Heßdorf (DE)

(72) Inventors: Frank Schieber, Erlangen (DE); Karsten Klinker, Hemhofen (DE); Jan-Peter Grosse, Möhrendorf (DE); Alexander Seitz, Erlangen (DE)

(73) Assignee: Schuler Pressen GmbH, Heßdorf (DE)

( * ) Notice: Subject to any disclaimer, the term of this patent is extended or adjusted under 35 U.S.C. 154(b) by 416 days.

(21) Appl. No.: 17/274,323

(22) PCT Filed: Oct. 9, 2019

(86) PCT No.: PCT/EP2019/077339
§ 371 (c)(1),
(2) Date: Mar. 8, 2021

(87) PCT Pub. No.: WO2020/078792
PCT Pub. Date: Apr. 23, 2020

(65) Prior Publication Data
US 2021/0323096 A1     Oct. 21, 2021

(30) Foreign Application Priority Data
Oct. 16, 2018   (DE) .......................... 102018125620.5

(51) Int. Cl.
*B23K 26/38*     (2014.01)
*B23K 26/03*     (2006.01)
(Continued)

(52) U.S. Cl.
CPC ............ *B23K 26/38* (2013.01); *B23K 26/032* (2013.01); *B23K 26/0846* (2013.01);
(Continued)

(58) Field of Classification Search
CPC .. G01B 7/14; B23K 26/1464; B23K 2101/16; B23K 2101/18; B23K 26/0876; B23K 26/0846; B23K 26/032; B23K 26/38
(Continued)

(56) References Cited

U.S. PATENT DOCUMENTS 4,328,411 A * 5/1982 Haller .................. H02K 15/026
                                                      225/2
4,613,269 A * 9/1986 Wilder ...................... G06T 7/11
                                                     414/730
(Continued)

FOREIGN PATENT DOCUMENTS

CN         102430863 A      5/2012
CN         103212846 A      7/2013
(Continued)

OTHER PUBLICATIONS

Schloth, Patrick; International Search Report; PCT/EP2019/077339; dated Jan. 27, 2020; 4 pages.

*Primary Examiner* — Jimmy Chou
(74) *Attorney, Agent, or Firm* — Bradley Arant Boult Cummings LLP (57) ABSTRACT

The invention relates to a method for cutting a sheet metal blank from a sheet metal strip (1) continuously conveyed in a transport direction (T), by means of at least one laser cutting device (3), having the following steps:
providing a laser cutting device (3) with at least one laser cutting head (5) which has a cutting nozzle (7) and which can be moved along a cutting path (S1, S2, S1', S2') specified so as to correspond to the geometry of the sheet metal blank by means of a controller (6), incrementally measuring the distance between the cutting nozzle (7) and the surface of the sheet metal strip (1) at at least one radially outer position ($P_1$, $P_2$) relative to the cutting nozzle (7) by means of a first distance measuring device (8), (Continued)

controlling the movement of the laser cutting head such that the first distance measuring device (8, 9) constantly remains overlapping the sheet metal strip (1), into a second position, in which the cutting nozzle is overlapping the sheet metal strip (1), wherein the height of the cutting nozzle (7) relative to the surface of the sheet metal strip (1) is regulated using the first distance values supplied by the first distance measuring device (8, 9) when the cutting nozzle (7) is moved from the first position in the direction of the second position.

7 Claims, 3 Drawing Sheets (51) Int. Cl.
| | | |
|---|---|---|
| *B23K 26/08* | (2014.01) | |
| *B23K 101/18* | (2006.01) | |
| *B23K 101/16* | (2006.01) | |
| *B23K 26/14* | (2014.01) | |
| *G01B 7/14* | (2006.01) | |

(52) U.S. Cl.
CPC ...... *B23K 26/0876* (2013.01); *B23K 26/1464* (2013.01); *B23K 2101/16* (2018.08); *B23K 2101/18* (2018.08); *G01B 7/14* (2013.01)

(58) Field of Classification Search
USPC .......................................................... 219/68
See application file for complete search history.

(56) References Cited

U.S. PATENT DOCUMENTS

| | | | | |
|---|---|---|---|---|
| 4,618,938 A * | 10/1986 | Sandland | ................ | G06T 7/001 382/148 |
| 4,667,113 A * | 5/1987 | Nakajima | ............. | G06T 7/0006 250/559.08 |
| 4,794,222 A * | 12/1988 | Funayama | ........... | B23K 26/048 219/121.79 |
| 5,387,061 A * | 2/1995 | Barkman | ............... | B23Q 17/24 409/80 |
| 5,489,758 A * | 2/1996 | Nihei | ................. | B23K 26/0884 901/42 |
| 5,624,588 A * | 4/1997 | Terawaki | ............. | B23K 9/1272 901/42 |
| 5,751,584 A * | 5/1998 | Yuasa | ............... | G05B 19/4068 700/174 |
| 5,864,114 A * | 1/1999 | Fukuda | ............... | B23K 26/032 219/121.69 |
| 6,008,465 A * | 12/1999 | Horn | .................... | B23K 26/123 219/121.72 |
| 6,084,223 A * | 7/2000 | Dietz | ................... | B23K 26/032 219/121.64 |
| 6,353,203 B1 * | 3/2002 | Hokodate | ........... | B23K 26/032 219/121.75 |
| 6,430,472 B1 * | 8/2002 | Boillot | ................ | G05B 19/056 901/41 |
| 6,563,130 B2 * | 5/2003 | Dworkowski | .......... | G01S 17/46 702/158 |
| 6,603,136 B1 * | 8/2003 | Wagner | .................. | B23K 26/04 250/221 |
| 6,617,541 B1 * | 9/2003 | Wadman | ............... | B23K 26/18 349/139 |
| 6,632,053 B2 * | 10/2003 | Koch | ................ | G05B 19/4061 700/193 |
| 6,710,294 B2 * | 3/2004 | Lawson | ............... | B23K 26/142 219/121.84 |
| 6,974,930 B2 * | 12/2005 | Jense | ................... | B23K 26/046 359/201.1 |
| 7,005,606 B2 * | 2/2006 | Legge | .................... | B23K 26/04 219/121.82 |
| 7,062,351 B2 * | 6/2006 | Wampler | ........... | G05B 19/4069 700/178 |
| 7,283,892 B1 * | 10/2007 | Boillot | .................... | G01S 17/46 901/41 |
| 7,638,731 B2 * | 12/2009 | Kosmowski | ......... | B23K 26/389 219/121.68 |
| 7,764,039 B2 * | 7/2010 | Yamaguchi | ........ | G05B 19/4061 318/560 |
| 8,175,858 B2 * | 5/2012 | Naganawa | ......... | G05B 19/4069 703/7 |
| 8,367,969 B2 * | 2/2013 | Caristan | ................ | B23K 26/38 219/121.72 |
| 8,581,144 B2 * | 11/2013 | Furuta | .................. | B23K 26/046 219/121.75 |
| 8,987,634 B2 * | 3/2015 | Pieger | .................... | B23K 31/12 219/121.84 |
| 9,110,459 B2 * | 8/2015 | Matsumoto | .......... | B23Q 39/027 |
| 9,122,267 B2 * | 9/2015 | Morita | .................... | G06T 7/564 |
| 10,507,558 B2 * | 12/2019 | Inaba | ................. | B23Q 3/15534 |
| 11,396,057 B2 * | 7/2022 | Boillot | .................... | G01S 17/86 |
| 11,583,951 B2 * | 2/2023 | Fahrni | .................... | B23K 26/08 |
| 2003/0192865 A1 * | 10/2003 | Cole, III | ............... | B23K 26/211 700/166 |
| 2003/0209528 A1 * | 11/2003 | Choo | ....................... | B28D 5/00 219/121.72 |
| 2004/0206735 A1 * | 10/2004 | Okuda | ................... | B23K 26/04 219/121.78 |
| 2005/0010324 A1 * | 1/2005 | Kaever | ............. | G05B 19/4061 700/178 |
| 2005/0226377 A1 * | 10/2005 | Wong | ................. | G05B 19/4061 378/65 |
| 2007/0075054 A1 * | 4/2007 | Nakamura | ............. | B23K 26/04 219/121.61 |
| 2007/0084837 A1 * | 4/2007 | Kosmowski | ....... | B23K 26/0853 219/121.68 |
| 2007/0228025 A1 * | 10/2007 | Horn | ..................... | B23K 26/142 219/121.84 |
| 2009/0127762 A1 * | 5/2009 | Kilian | ................ | B23K 37/0408 269/296 |
| 2010/0133243 A1 * | 6/2010 | Nomaru | ............... | B23K 26/032 219/121.67 |
| 2010/0176099 A1 * | 7/2010 | Hilderbrand | ......... | G05B 19/401 340/686.1 |
| 2011/0089956 A1 * | 4/2011 | Hermann | ............... | B23K 26/03 324/686 |
| 2011/0100967 A1 * | 5/2011 | Yoo | ......................... | G01N 27/00 219/121.73 |
| 2011/0210109 A1 * | 9/2011 | Szelagowski | .......... | B23K 26/38 219/121.72 |
| 2011/0278268 A1 * | 11/2011 | Siman-Tov | ............... | B41C 1/02 219/121.69 |
| 2011/0313561 A1 * | 12/2011 | Lee | ........................ | G06T 7/0004 700/166 |
| 2012/0111839 A1 * | 5/2012 | Grassi | ................ | B23K 26/0884 219/121.81 |
| 2012/0267349 A1 * | 10/2012 | Berndl | ................... | B23K 26/046 219/121.65 |
| 2013/0200052 A1 * | 8/2013 | Wittwer | ................ | B23K 26/046 219/121.75 |
| 2013/0256285 A1 * | 10/2013 | Baxter | ................. | B23K 26/048 219/121.72 |
| 2014/0103019 A1 * | 4/2014 | Galvagnini | .......... | B23K 26/702 219/121.85 |
| 2014/0116997 A1 * | 5/2014 | Inoue | .................... | B23K 26/38 219/121.67 |
| 2014/0138363 A1 * | 5/2014 | Hammann | ............. | B23K 26/03 219/121.78 |
| 2014/0263211 A1 * | 9/2014 | Hassan | ................ | B23K 26/361 219/121.81 |
| 2015/0028007 A1 * | 1/2015 | Pluss | ................... | B23K 26/40 219/121.68 |
| 2015/0151381 A1 * | 6/2015 | Kurosawa | .......... | B23K 26/1464 219/121.83 |
| 2015/0241868 A1 * | 8/2015 | Matsumoto | ........ | B23K 26/0892 700/114 |

(56) References Cited

U.S. PATENT DOCUMENTS

| | | | |
|---|---|---|---|
| 2015/0266133 A1* | 9/2015 | Tokito | B23K 26/083 219/121.6 |
| 2015/0273626 A1* | 10/2015 | Tokito | B23K 26/043 219/121.6 |
| 2015/0352679 A1* | 12/2015 | Yamamoto | B23Q 17/00 73/865.8 |
| 2015/0360324 A1 | 12/2015 | Erlwein | |
| 2016/0059347 A1* | 3/2016 | Kogel-Hollacher | B23K 26/082 219/121.73 |
| 2016/0059350 A1* | 3/2016 | Schoenleber | B23K 26/04 219/121.81 |
| 2016/0059351 A1* | 3/2016 | Miyashita | B23K 26/048 219/121.81 |
| 2016/0096239 A1* | 4/2016 | Raichle | B23K 26/1436 219/74 |
| 2016/0114434 A1* | 4/2016 | Regaard | B23K 26/046 219/121.81 |
| 2016/0158884 A1* | 6/2016 | Hagenlocher | B23K 26/042 219/121.85 |
| 2016/0184923 A1* | 6/2016 | Tokito | B23K 26/048 219/121.81 |
| 2016/0193692 A1* | 7/2016 | Regaard | B23K 31/125 219/121.62 |
| 2016/0214207 A1 | 7/2016 | Okazaki | |
| 2017/0157702 A1* | 6/2017 | Takada | B23K 26/03 |
| 2017/0232558 A1* | 8/2017 | Kano | B23K 26/382 219/121.72 |
| 2017/0236738 A1* | 8/2017 | Van Lieshout | B23K 26/364 425/174 |
| 2017/0334019 A1* | 11/2017 | Izumi | B23K 26/032 |
| 2018/0076060 A1* | 3/2018 | Oh | H01L 21/68757 |
| 2018/0257177 A1 | 9/2018 | Sato et al. | |
| 2018/0277435 A1* | 9/2018 | Fujita | B23K 26/53 |
| 2019/0128857 A1* | 5/2019 | Hiramatsu | G01N 30/24 |
| 2020/0041249 A1* | 2/2020 | Strebel | B23K 26/032 |
| 2020/0047274 A1* | 2/2020 | Tani | B23K 26/032 |
| 2021/0308799 A1* | 10/2021 | Funaoka | B23K 26/16 |
| 2021/0402521 A1* | 12/2021 | Lin | B23K 26/361 |

FOREIGN PATENT DOCUMENTS

| | | |
|---|---|---|
| CN | 204262595 U | 4/2015 |
| CN | 106216849 A | 12/2016 |
| CN | 106413971 A | 2/2017 |
| CN | 108025399 A | 5/2018 |
| CN | 108067837 A | 5/2018 |
| CN | 108356429 A | 8/2018 |
| DE | 102011003395 B3 | 3/2012 |
| DE | 102011054360 B4 | 12/2016 |
| DE | 112014006909 B4 | 3/2018 |
| EP | 0503488 B2 | 12/1999 |
| EP | 2687317 A1 | 1/2014 |
| EP | 3007851 B1 | 10/2016 |
| JP | 2002160084 A | 6/2002 |
| JP | 2015073992 A | 4/2015 |
| WO | WO-2016031069 A1 | 3/2016 |
| WO | WO-2016181499 A1 * | 11/2016 ............ B23K 26/00 |

* cited by examiner

METHOD AND DEVICE FOR LASER CUTTING A SHEET METAL BLANK FROM A CONTINUOUSLY CONVEYED SHEET METAL STRIP

The invention relates to a method and a device for cutting a sheet metal blank from a sheet metal strip continuously conveyed in a transport direction by means of at least one laser cutting device.

Such a process and device are known, for example, from EP 3 007 851 B1. According to the known process, a sheet metal strip is unwound from a coil. The sheet metal strip is continuously conveyed in a transport direction by means of a transport device. In the process, the sheet metal strip passes through at least one laser cutting device. The laser cutting device comprises a portal with which a laser cutting head can be moved back and forth both in the transport direction and in a y-direction perpendicular thereto. The gantry is controllable by a control unit so that the laser cutting head can be moved along a predetermined cutting path.

EP 0 503 488 B2 discloses a laser cutting process and a laser cutting head. In the laser cutting process, a focused laser beam and a gas jet are guided through a cutting nozzle. A distance between the workpiece and the cutting nozzle is capacitively controlled. A sensor ring insulated from the cutting nozzle is used as a sensor for capacitive control of the distance.

When cutting a sheet metal blank from a sheet metal strip continuously conveyed in a transport direction, according to the state of the art a cutting path is always selected which starts inside the sheet metal strip and runs from the inside of the strip in the direction of a strip edge. When reaching the belt edge, the sheet metal blank may rise or fall relative to the sheet metal blank due to stresses in the sheet metal blank. This can lead to a collision with a capacitive distance sensor attached to the cutting nozzle. To counteract this, the prior art switches off the distance measurement shortly before the strip edge is reached. Furthermore, the laser cutting head is raised by a predetermined amount. Then the laser cutting head is moved over the sheet metal strip until the start of a new cutting path. The distance sensor system is then put back into operation and the laser cutting head is lowered again in the direction of the sheet metal strip.

The known method is time-consuming because of the required switching off and on of the distance sensor system and the lifting on and off of the laser cutting head. Apart from this, it is not possible with the known method to cut the sheet metal strip from the strip edge to the strip interior, since the distance sensor system does not provide usable distance values outside the sheet metal strip.

It is the object of the invention to eliminate the disadvantages according to the prior art. In particular, a method and a device are to be specified with which the cutting of a sheet metal blank from a sheet metal strip continuously conveyed in a transport direction is possible with improved effectiveness.

This object is solved by the features of claims 1 and 11. Practical embodiments of the invention result from the features of claims 2 to 10 and 12 to 20.

According to the invention, a method for cutting a sheet metal blank from a sheet metal strip continuously conveyed in a transport direction by means of at least one laser cutting device is proposed, comprising the following steps:

Providing a laser cutting device with at least one laser cutting head having a cutting nozzle, which is movable by means of a control unit along a predetermined cutting path corresponding to the geometry of the sheet metal blank, cyclic measurement of a distance between the cutting nozzle and a surface of the sheet metal strip at at least one radially outer position with respect to the cutting nozzle by means of a first distance measuring device, controlling a movement of the laser cutting head in such a way that, when the cutting nozzle is not in overlap with the sheet metal strip, the first distance measuring device always remains in overlap with the sheet metal strip, and moving the cutting nozzle from a first position not in overlap with the sheet metal strip to a second position in overlap with the sheet metal strip, wherein a height of the cutting nozzle with respect to the surface of the sheet metal strip is controlled using first distance values provided by the first distance measuring device when the cutting nozzle is moved from the first position toward the second position.

For the purposes of the present invention, the term "radially outer position" is understood to mean a position which is radially spaced from a circumferential edge of the cutting nozzle. A radial distance is at least 1 mm, preferably at least 2 mm, particularly preferably at least 3 mm, especially at least 5 mm. A maximum distance of the radially outer positions with respect to the circumferential edge of the cutting nozzle is expediently 30 mm, preferably 25 mm, particularly preferably 20 mm.

By measuring the distance to the surface of the sheet metal strip in the vicinity of the cutting nozzle in cycles according to the invention, the strip edge can now be detected. It is thus possible to control a movement of the laser cutting head in such a way that, when the cutting nozzle is not in overlap with the sheet metal strip, the first distance measuring device always remains in overlap with the sheet metal strip. As a result, a distance between the cutting nozzle and the sheet metal strip can still be measured with the distance measuring device in overlap with the sheet metal strip. With the method according to the invention, it is now possible in particular to guide cutting paths into the interior of the sheet metal strip from the outside as well. This opens up new freedom in the design of the cutting and travel paths of the laser cutting heads. In particular, it is possible to produce sheet blanks of a given geometry with shorter travel paths. This means that sheet blanks can be cut with improved efficiency from a sheet metal strip continuously conveyed in one transport direction.

According to an advantageous embodiment, a section of the cutting path begins at the edge of the sheet metal strip or of an aperture located in the sheet metal strip and extends toward the interior of the sheet metal strip.

According to a further advantageous embodiment, the generation of a laser beam exiting through the cutting nozzle during cutting operation is temporarily interrupted when the cutting nozzle is not in overlap with the sheet metal strip. The laser beam can be activated when cutting operation is resumed shortly before reaching the sheet metal strip, i.e., when the cutting nozzle is not yet in overlap with the sheet metal strip. However, it is also possible that a laser beam exiting through the cutting nozzle is generated when the cutting nozzle is moved from the first to the second position. This can ensure that the cut ends at the edge of the sheet metal strip or in an opening in the sheet metal strip.

According to another particularly advantageous embodiment, cutting parameters for generating the laser beam can be changed when the cutting nozzle is in the first position. In the first position, the cutting nozzle is not in overlap with the sheet metal strip. By changing cutting parameters in the first position, for example, the cutting speed can be increased or decreased. For example, a sheet metal strip with a different thickness can be cut.

According to a further embodiment, the distance between the cutting nozzle and the surface of the sheet metal strip is measured by means of the first distance measuring device at several different positions that are radially outward with respect to the cutting nozzle. This makes it possible to observe a surrounding area of the cutting nozzle on all sides simultaneously.

The cutting nozzle can be part of a second distance measuring device and by means of the second distance measuring device a second distance value can be measured. The first and/or second distance values can be used to control the distance between the cutting nozzle and the surface of the sheet metal strip. The proposed method is redundant and exhibits particularly high reliability in practical operation.

When two distance measuring devices are provided, a movement of the laser cutting head from the second position to the first position can be stopped if one of the two distance values or a difference between the two distance values is greater than a predetermined limit value.

Advantageously, capacitive or optical first or second distance measuring devices are used to measure the first and second distance values respectively. The optical distance measuring devices can be laser distance measuring devices, for example.

According to a further provision of the invention, an apparatus for cutting a sheet metal blank from a sheet metal strip continuously conveyed in a conveying direction is proposed, comprising:
  a transport device for continuous transport of a sheet metal strip in a transport direction,
  at least one laser cutting device having at least one laser cutting head which has a cutting nozzle and is held on a portal such that it can be moved back and forth in the transport direction and in a y-direction running perpendicular to the transport direction,
  a control unit for moving the laser cutting head along a cutting path corresponding to the geometry of the sheet metal blank,
  a first distance measuring device for cyclically measuring a distance between the cutting nozzle and a surface of the sheet metal strip at at least one radially outer position with respect to the cutting nozzle,
  a control unit for regulating the distance between the cutting nozzle and a surface of the sheet metal strip,
  wherein a movement of the laser cutting head can be controlled by means of the control unit in such a way that the first distance measuring device always remains in overlap with the sheet metal strip when the cutting nozzle is not in overlap with the sheet metal strip,
  and wherein by means of the control unit a height of the cutting nozzle with respect to the surface of the sheet metal strip is controlled using the first distance values provided by the first distance measuring device when the cutting nozzle is moved from a first position which is not in overlap with the sheet metal strip towards a second position which is in overlap with the sheet metal strip.

The term "distance between the cutting nozzle and a surface of the sheet metal strip" is understood to mean the distance between an opening plane of the cutting nozzle and the surface of the sheet metal strip. The term "height of the cutting nozzle with respect to the surface of the sheet metal strip" is understood to mean a distance between the opening plane of the cutting nozzle and an imaginary surface of the sheet metal strip, which extends over the edge of the sheet metal strip or an opening in the sheet metal strip.

In the proposed device, the "transport device" can be, for example, a roll straightening machine, transport rolls or other devices with which a sheet metal strip can be moved continuously in a transport direction. The "control unit" is expediently a process computer control, a microcomputer or the like, with which in particular the movements of the laser cutting head can be controlled. The control unit may also comprise a "closed-loop control". I.e., the control unit be designed not only for the two-dimensional movement of the laser cutting head according to predetermined cutting and traversing paths, but also for controlling a predetermined distance of the cutting nozzle relative to the surface of the sheet metal strip.

The control unit is set up or programmed so that the cutting path is controlled on the basis of the first distance values in such a way that the first distance measuring device is always in overlap with the sheet metal strip. As a result, measurement of the distance between the cutting nozzle and the surface of the sheet metal strip is still possible even when the cutting nozzle is outside the sheet metal strip. The cutting nozzle can be guided at a predetermined distance with respect to the surface of the sheet metal strip from the outside in the direction of the strip edge. The laser beam emerging from the cutting nozzle can then be used to cut from the strip edge to the strip interior.

Furthermore, the control unit can be set up in such a way that a cutting process by means of the laser cutting head is only started when one of the two distance values is smaller than the specified limit value. This makes it possible, in particular, to cut a sheet metal blank starting at the strip edge and moving toward the strip interior.

The first and/or the second distance measuring device can be capacitive or optical first and second distance measuring devices. The first distance measuring device can comprise one or more distance sensors, which are expediently mounted on the laser cutting head. According to a particularly advantageous embodiment, the first distance sensors are mounted at the same radial distance with respect to an axis of the cutting nozzle. Furthermore, the first distance sensors are mounted at the same distance with respect to an opening plane of the cutting nozzle in the axial direction. This enables simplified measurement and evaluation of the first distance values.

According to a further advantageous embodiment, the cutting nozzle is part of a second distance measuring device and a second distance value is measured by means of the second distance measuring device. A second distance sensor of the second distance measuring device can, for example, radially surround the cutting nozzle.

Because of the further advantageous embodiments of the device, reference is made to the features already described for the method, which can also form advantageous embodiments of the device.

The method and apparatus are explained in more detail below with reference to the drawings. They show.

xx

Figure 1:
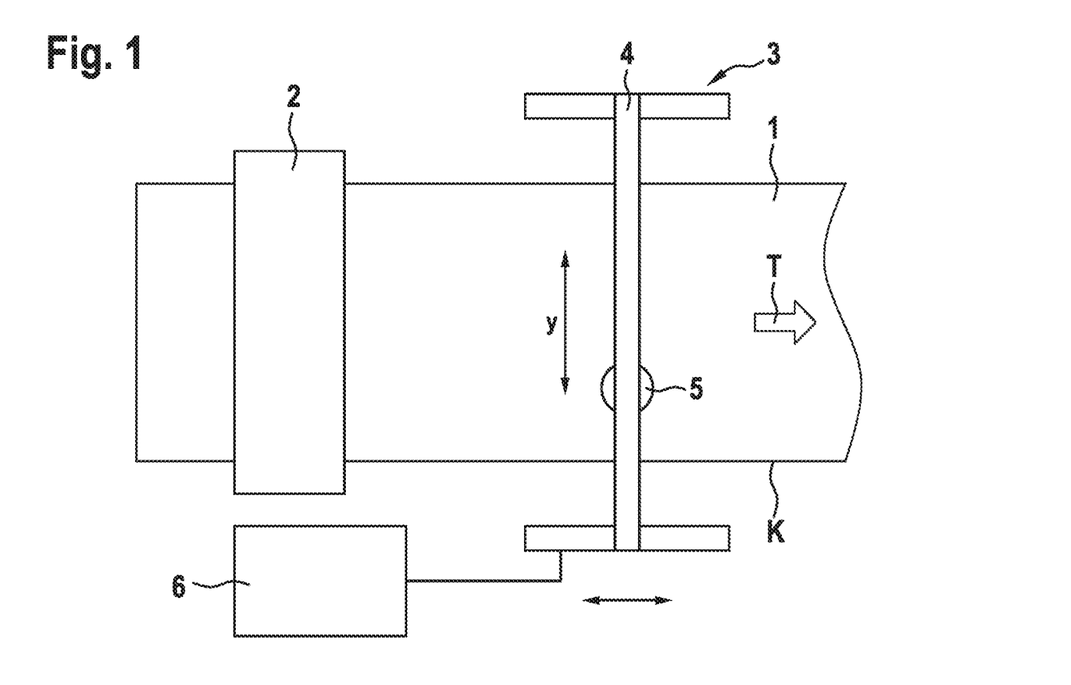
FIG. 1 a schematic top view of a device for cutting sheet metal blanks,
  FIG. 2 a schematic side view of a laser cutting head,
  FIG. 3 a schematic sectional view according to section line A-A' in FIG. 2,
  FIG. 4 another schematic sectional view through a laser cutting head,
  FIG. 5 a top view of a sheet metal strip section with cutting and traversing paths and FIG. 6 a top view of a sheet metal strip section with alternative cutting and travel paths.

In FIG. 1, a sheet metal strip 1 is guided by a transport device 2. The transport device 2 can be, for example, a roll straightening machine. Reference sign 3 generally denotes a laser cutting device in which a laser cutting head 5 is attached to a gantry 4. The laser cutting head 5 is movable in and against a transport direction T as well as in and against a y-direction y extending perpendicular to the transport direction T. Furthermore, the laser cutting head 5 is movable in a z-direction perpendicular to the y-direction and the transport direction T, so that a distance between the laser cutting head 5 and a surface of the sheet metal strip 1 is variable.

The reference sign 6 designates a control unit which is connected in particular to the gantry 4 for the exchange of signals. By means of the control unit 6, the gantry 4 can be controlled in such a way that the laser cutting head 5 is guided along a predetermined cutting path corresponding to the geometry of a sheet metal blank to be produced. Furthermore, the control unit 6 can be used to control a distance between the laser cutting head 5 and a surface of the sheet metal strip 1. —Several laser cutting heads 5 can also be movably mounted on the gantry 4.

Figure 2:
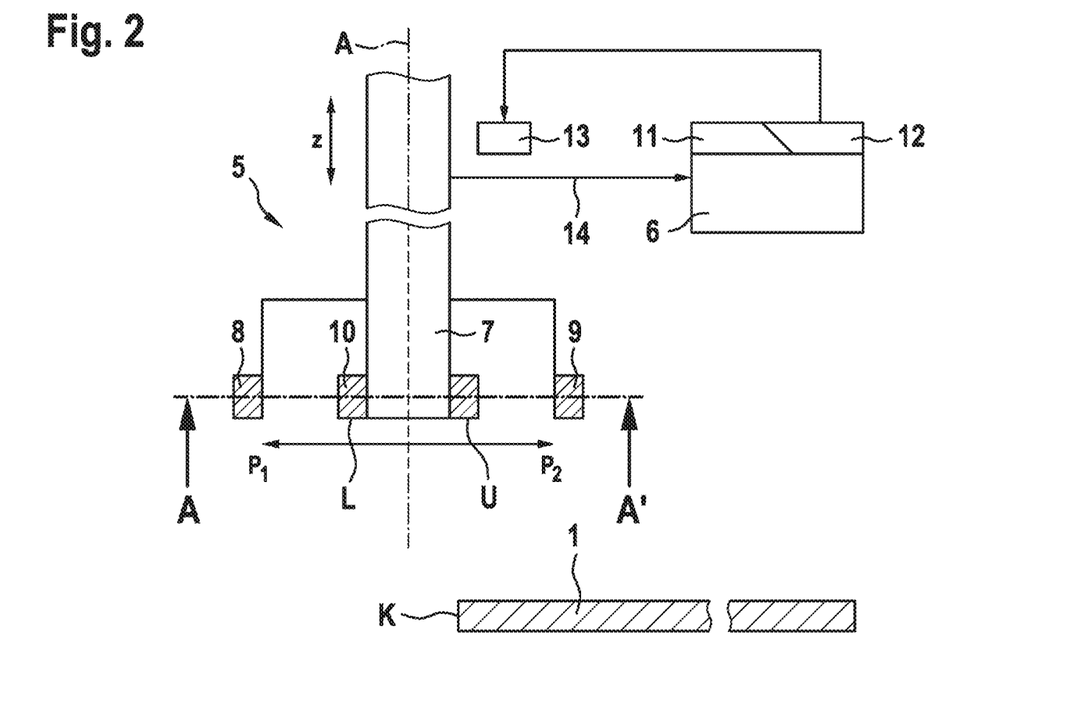

FIG. 2 shows a schematic side view of the laser cutting head 5. A cutting nozzle 7 of the laser cutting head 5 is used to discharge cutting gas. Furthermore, a laser beam L exits through the cutting nozzle 7. An axis of the cutting nozzle 7 approximately congruent with the laser beam is designated with the reference sign A. A first distance sensor 8 of a first distance measuring device is mounted at a first radially outer position $P_1$ of the cutting nozzle 7. A second distance sensor 9, which is also part of the first distance measuring device, is expediently mounted at a second radially outer position $P_2$. The distance sensors 8, 9 can be capacitive or optical distance sensors. In the embodiment examples shown in FIG. 2, the first distance measuring device 8 and the second distance measuring device 9 are arranged at approximately the same radial distance with respect to the axis A. However, it is also possible that the first 8 and the second distance measuring device 9 are arranged at a different radial distance with respect to the axis A.

The reference sign 10 designates a further distance sensor of a second distance measuring device, which directly surrounds the cutting nozzle 7 in the radial direction. The further distance sensor 10 is therefore provided at a radially inner position with respect to the cutting nozzle 7.

A circumferential edge of the cutting nozzle 7 is designated by the reference sign U. A "radially outer position" in the sense of the present invention is present if the respective distance sensor 8, 9 of the first distance measuring device is arranged at a distance of at least 2 mm, preferably at least 5 mm, particularly preferably at least 10 mm from the circumferential edge U or an outer circumferential surface of the cutting nozzle 7.

The controller unit 6, which may be a computer, is provided with a comparison device 11 and a control device 12. The comparison device 11 and the control device 12 can be correspondingly prepared program sections of the control unit 6. The reference sign 13 designates an actuator which is coupled to the control device 12. By means of the actuator 13, the laser cutting head 5 or the cutting nozzle 7 can be raised and lowered in the z-direction. The reference sign 14 designates a signal line via which the measured values measured by the distance measuring devices are transmitted to the control unit 6.

The function of the device is as follows:

By means of the control unit 6, drive devices (not shown here) on the gantry 4 are controlled in such a way that the laser cutting head 5 is moved along a predetermined cutting path over the sheet metal strip 1, which is continuously moved in the transport direction T. The laser cutting head 5 is then moved along the sheet metal strip 1. During the movement of the laser cutting head 5, the respective first distances to the surface of the sheet metal strip 1 are measured cyclically or quasi-continuously by means of the first distance measuring device. The corresponding first distance values are transmitted to the control unit 6 via the signal line 14. The first distance values are compared by means of the comparison device 11. As soon as one of the two distance values exceeds a predetermined limit value or a difference between the distance values lies outside a predetermined limit value, a switch-off signal is generated and transmitted to the control unit 6. As a result, the movement of the laser cutting head 5 is stopped, in such a way that one of the first distance sensors 8, 9 remains in overlap with the sheet metal strip 1. With the distance sensor 8, 9 in overlap with the sheet metal strip 1, the distance of the laser cutting nozzle 7 to the sheet metal strip can continuously to be kept within a predetermined range. Thus, different from the prior art, it is no longer necessary to raise the laser cutting head 5 before passing over the edge of the strip. Apart from this, it is possible to move the laser cutting head 5 by means of the control unit 6 along a next cutting path which runs from the strip edge towards the interior of the sheet metal strip. The now possible guidance of a cutting path from the strip edge towards the inside of the sheet metal strip creates new freedom in the cutting strategy. Cutting paths can be changed and traverse paths shortened. This means that the time required to produce a sheet blank can be reduced.

As can be seen further from FIG. 2, the movement of the laser cutting head 5 is expediently stopped in such a way that one of the distance sensors 8, 9 and the axis A of the cutting nozzle 7 no longer cover the sheet metal strip 1, but the other distance sensor 9 covers the sheet metal strip 1.

In the embodiment example shown in FIG. 2, two first distance sensors 8, 9 are provided. Of course, it is also possible that a device in which only a first distance sensor is provided is used to carry out the method according to the invention. In this case, the cutting nozzle 7 is preferably rotatable so that the first distance sensor 8 attached thereto can be rotated in each case to a position in which it remains in overlap with the sheet metal strip when the cutting nozzle is not in overlap with the sheet metal strip.

In a particularly simple embodiment, it is also possible to omit the further distance sensor 10 shown in FIG. 2. I.e., the method according to the invention can also be carried out with a single first distance sensor 8, which is mounted in a radially outer position P1 of the cutting nozzle 7. —In this case, a movement of the laser cutting head is controlled by means of the control unit in such a way that the first distance sensor 8, as a component of the first distance measuring device, always remains in overlap with the sheet metal strip. By means of the first distance measuring device, the distance between the cutting nozzle 7 and the surface of the sheet metal strip is measured cyclically or quasi-continuously. A distance between the cutting nozzle 7 and the surface of the sheet metal strip is controlled on the basis of the first distance values supplied by the first distance measuring device. Provided that the cutting nozzle 7 is located at a first position that is not in overlap with the sheet metal strip, the height of the cutting nozzle 7 with respect to the surface of the sheet metal strip is further controlled using the first distance values provided by the first distance measuring device when the cutting nozzle 7 is moved from the first position toward the second position.

Figure 3:
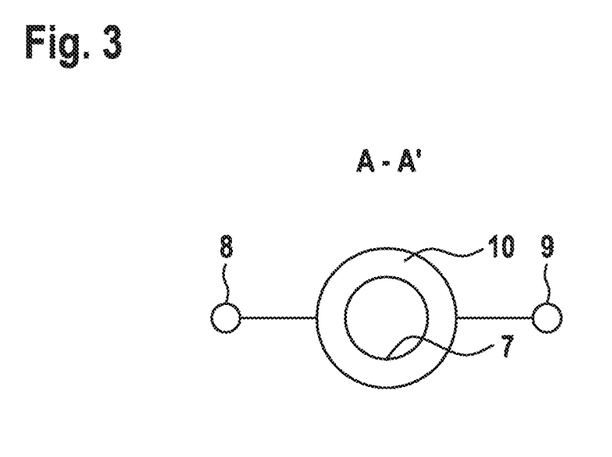
Figure 4:
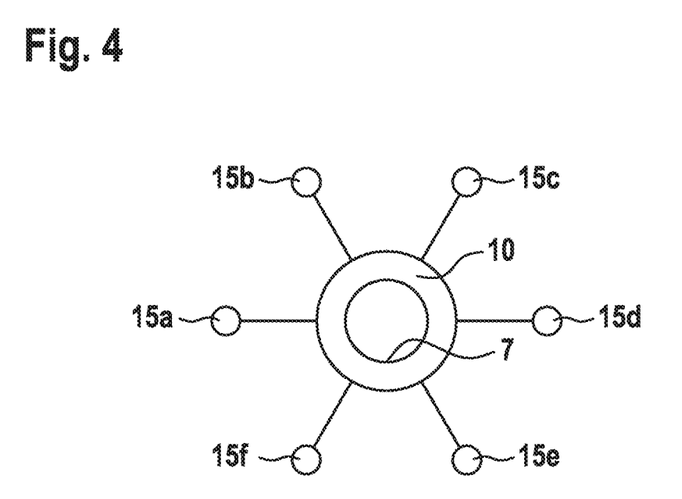

FIG. 3 shows a section according to section line A-A' in FIG. 2. For reliable detection of the strip edge or any recesses in the sheet metal strip 1, several first distance sensors, for example 3, 4, 5, 6 or more, may be fitted in radially outer positions $P_1, P_2, \ldots P_n$. FIG. 4 shows a cutting nozzle 7 in which further first distance sensors 15a, 15b, 15c, 15d, 15e and 15f are mounted in radially outer positions. This makes it possible to detect the distance of the entire radial environment of the cutting nozzle 7. This further increases process reliability.

Figure 5:
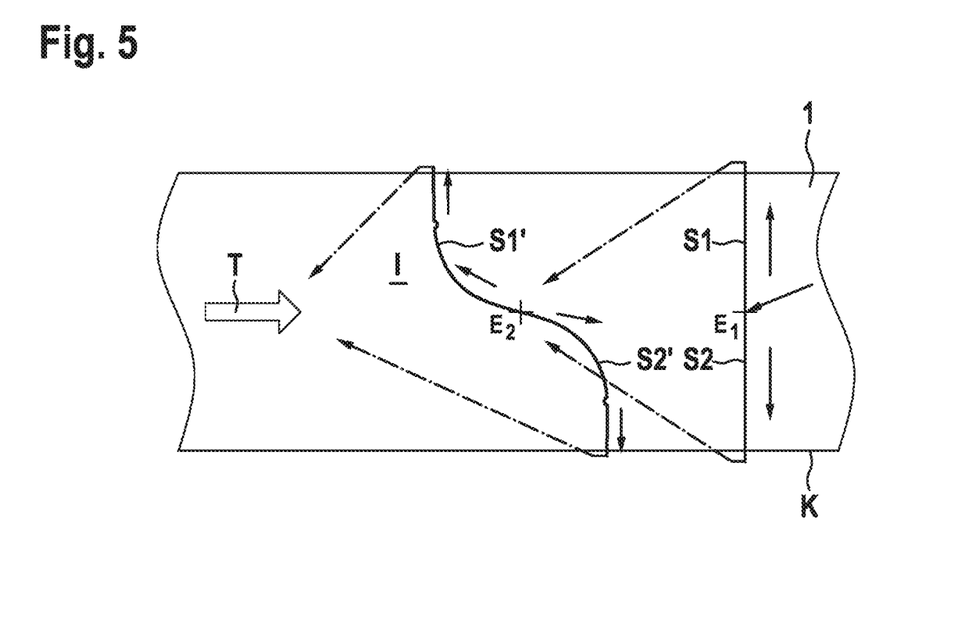

FIG. 5 shows a top view of a sheet metal strip 1, in which first cutting paths S1 of a first laser cutting head and second cutting paths S2 of a second laser cutting head are each guided starting from the strip interior I of the sheet metal strip 1 and to the strip edge K. To produce the sheet metal blank, the first laser cutting head is first moved over the first puncture point E1. Then, starting from the first puncture point E1, the first laser cutting head is moved along the first cutting path S1 to the strip edge K. As soon as the first laser cutting head is outside a collision area, a second laser cutting head is moved to the first puncture point E1. The second laser cutting head is moved along the second cutting path S2 towards the strip edge K.

To produce the further first cutting path S1', the first laser cutting head is moved to the second puncture point E2. Subsequently, the first laser cutting head is moved from the second puncture point E2 along the further first cutting path S1' toward the strip edge K. Similarly, the second laser cutting head is moved to the second puncture point E2 as soon as a collision with the first laser cutting head is no longer possible. Subsequently, the second laser cutting head is moved from the second puncture point E2 in the direction of the strip edge K along the further second cutting path S2'.

Figure 6:
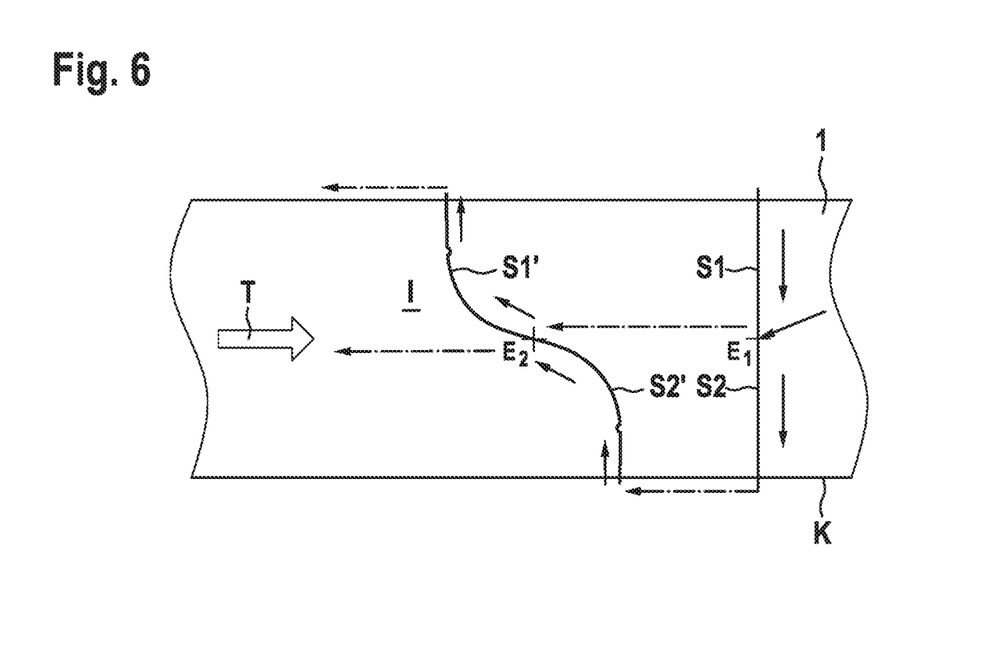

The travel paths of the laser cutting heads, i.e. the movement paths of the laser cutting heads when the laser is switched off, are marked with interrupted arrow lines in FIGS. 5 and 6 respectively. The cutting paths S1, S2 and the further cutting paths S1' and S2' are marked with solid lines.

FIG. 6 shows in comparison a top view of the sheet metal strip 1 according to FIG. 5. For the production of the sheet metal blank—as in FIG. 5—the first and second cutting paths S1, S2 and subsequently the further first cutting path S1' and the further second cutting path S2' are to be produced. In particular, using the apparatus according to the invention, it is now possible to guide some of the cutting paths S1, S2, S1', S2' from the strip edge K towards the strip interior I. In the present example, the first laser cutting head is first moved from the strip edge K in the direction of the first puncture point E1 along the first cutting path S1. At the same time, the second laser cutting head can be guided from the first puncture point E1 in the direction of the strip edge K along the second cutting path S2. The second laser cutting head is then moved along a travel path outside the sheet metal strip 1. Subsequently, the second laser cutting head is moved from the strip edge K into the strip interior I along the further second cutting path S2'. The first laser cutting head is moved along a travel path from the first puncture point E1 to the second puncture point E2. The first laser cutting head is then activated and moved from the second puncture point E2 along the further first cutting path S1' toward the strip edge K.

As can be seen in FIG. 6, only a single laser cutting head is used at the first puncture point E1 and at the second E2 puncture point—in contrast to the example shown in FIG. 5. To avoid a collision of the laser cutting heads, it is no longer necessary to wait until one of the two laser cutting heads is at a sufficient distance from the puncture point E1, E2. The production of the first cutting path S1 and the second cutting path S2 can start simultaneously. The same applies to the production of the further first cutting path S1' as well as the further second cutting path S2'. Apart from this, the traverse paths are shorter compared to the example shown in FIG. 5. Overall, there is a significant reduction in the process time for producing the sheet metal blank.

LIST OF REFERENCE SIGNS 1 sheet metal strip
2 transport device
3 laser cutting device
4 gantry
laser cutting head
6 control unit
7 cutting nozzle
8 first distance measuring device
9 second distance measuring device
10 third distance measuring device
11 comparison facility
12 control device
13 actuator
14 signal line
15a-f further distance measuring devices
A axis
E1 first puncture point
E2 second puncture point
I strip interior
K strip edge
L laser beam
$P_1$ first position
$P_2$ second position
S1 first cutting path
S1' further first cutting path
S2 second cutting path
S2' further second cutting path
T transport direction
U circumferential edge
y y-direction
z z-direction

The invention claimed is:

1. A method for cutting a sheet metal blank from a sheet metal strip continuously conveyed in a transport direction via at least one laser cutting device, the method comprising:
   providing a laser cutting device with at least one laser cutting head having a cutting nozzle, which can be moved via a control unit along a predetermined cutting path corresponding to the geometry of the sheet metal blank;
   cyclic measurement of a distance between the cutting nozzle and a surface of the sheet metal strip at at least one radially outer position with respect to the cutting nozzle via a first distance measuring device;
   controlling a movement of the laser cutting head in such a way that, when the cutting nozzle is not in overlap with the sheet metal strip, the first distance measuring device always remains in overlap with the sheet metal strip;
   wherein the first distance measuring device comprises one of (i) and (ii) below:
   (i) comprises only one distance sensor attached to a rotatable cutting nozzle, wherein the distance sensor is rotated to a position in which the distance sensor remains in overlap with the sheet metal strip when the cutting nozzle is not in overlap with the sheet metal strip; and (ii) comprises several distance sensors for measuring the distance between the cutting nozzle and the surface of the sheet metal strip at several different positions which are radially outside the cutting nozzle, wherein the distance between the cutting nozzle and the surface of the sheet metal strip is measured at a plurality of different positions which are radially outwardly located with respect to the cutting nozzle via the first distance measurement device; moving the cutting nozzle from a first position not in overlap with the sheet metal strip to a second position in overlap with the sheet metal strip, wherein a height of the cutting nozzle with respect to the surface of the sheet metal strip is controlled using first distance values provided by the first distance measuring device when the cutting nozzle is moved from the first position towards the second position; and wherein at least a section of the cutting path starts at the edge of the sheet metal strip or of an aperture located in the sheet metal strip and runs to the interior of the sheet metal strip, wherein when the cutting nozzle is moved from the first to the second position, a laser beam passing through the cutting nozzle.

2. The method according to claim 1, wherein the irradiation of a laser beam passing through the cutting nozzle during cutting operation is temporarily interrupted when the cutting nozzle is not in overlap with the sheet metal strip.

3. The method according to claim 1, wherein cutting parameters for generating the laser beam are changed when the cutting nozzle is in the first position.

4. The method according to claim 1, wherein the cutting nozzle is part of a second distance measuring device and second distance values are measured via the second distance measuring device.

5. The method according to claim 4, wherein at least one of the first distance values and the second distance values are used to control the distance between the cutting nozzle and the surface of the sheet metal strip.

6. The method according to claim 1, wherein a movement of the laser cutting head occurring from the second position to the first position is stopped when one of a first distance value and a second distance value or a difference between the first distance value and the second distance value is greater than a predetermined limit value.

7. The method according to claim 4, wherein capacitive or optical distance measuring devices are used for measuring at least one of the first distance values and the second distance values.

* * * * *